Sept. 10, 1940.  G. H. EVANS  2,214,412
DISPLAY SIGN
Filed Jan. 27, 1939  2 Sheets-Sheet 1

Inventor
George H. Evans
By Stevens and Davis
Attorneys

Sept. 10, 1940.      G. H. EVANS      2,214,412
DISPLAY SIGN
Filed Jan. 27, 1939      2 Sheets-Sheet 2
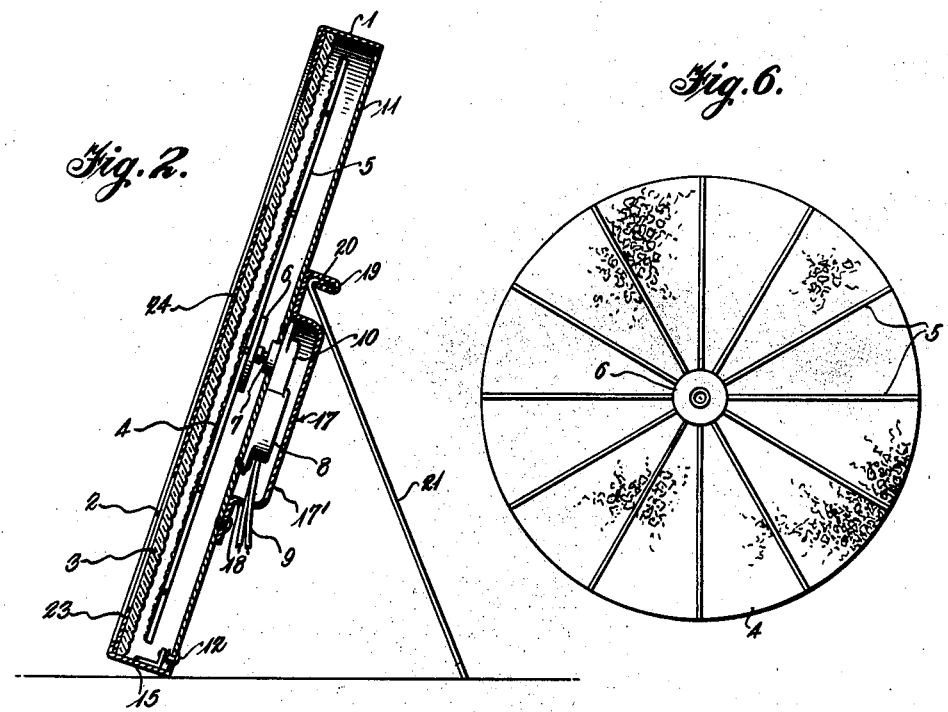
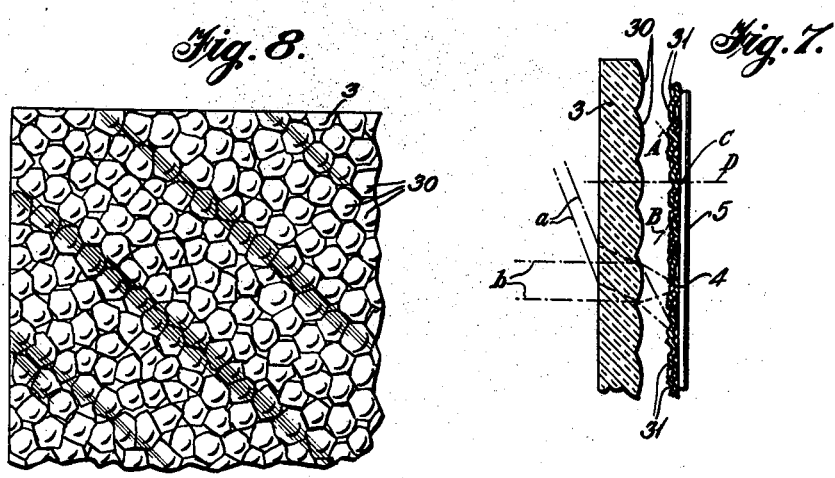
Inventor
George H. Evans
By Stevens and Davis
Attorneys Patented Sept. 10, 1940

2,214,412

UNITED STATES PATENT OFFICE 2,214,412

DISPLAY SIGN

George H. Evans, Washington, D. C., assignor of one-half to Richard K. Stevens, Washington, D. C.

Application January 27, 1939, Serial No. 253,191

21 Claims. (Cl. 40—133)

This invention relates to advertising devices and more particularly to display signs having means for causing the motion of a light pattern.

Heretofore in the designing of advertising mediums it has been a well recognized fact that a display sign including motion is more attractive than one which is motionless. Consequently, many types of displays, which have incorporated various moving parts, have been produced in an effort to attract the attention of the potential buyer. The motion has been of various types and has included many different kinds of moving parts. Reflecting media has been extensively used in an effort to simulate various types of motion. The vast majority of these signs, however, are not particularly attractive, nor have they incurred any considerable amount of success. The failure of these signs has been due to many reasons such as their appearance, or due to the cost of the sign and/or the expense of operation or to the number of working parts which may readily become disorganized. Furthermore, many signs are so irritating to the eyes that an observer cannot read the sign even though it may attract his attention.

In view of the above situation the object of the present invention is to provide an advertising sign and/or display device that presents an illuminated design or light pattern that is caused to move in a manner such that it will attract the attention of the public. In addition this invention contemplates means for presenting a movement of light so that the physical shape of the means for causing the light pattern is disguised to present a sparkling, bubbling and scintillating effect. Furthermore, the light, motion or image causing means is adapted to provide the maximum amount of light with the minimum of material so that these devices may be constructed and operated at low cost and may be attractive and readily visible in practically all degrees of light. Though this illuminated effect has a great attracting power, it is not irritating to the eyes and consequently the observer's attention is not only gained but retained sufficiently to cause him to read the sign.

According to the preferred embodiment of this invention, a rotatable reflecting medium is provided in back of an optically effective screen in such a manner that this reflecting medium may receive light from any desired source and direct the light rays through the screen. Either the reflecting means or the optically effective screen or both may be so fashioned that they will divide these light rays into a plurality of rays, and distort and/or disguise the reflected image. The preferred type of reflecting medium comprises a relatively flat sheet of reflecting material such as metal foil, the reflecting surface of which is formed so as to present a plurality of minute reflecting faces which lie at various angles with respect to each other. By the use of such a reflecting surface light may be received from substantially any direction and may be reflected in a predetermined direction and through the optically effective screen. The screen may be composed of any desirable medium but preferably it comprises a glass plate, at least one side of which is serrated or undulating to form a plurality of optically effective elements on said surface. A light source may be positioned with respect to the reflecting medium and the optically effective screen so as to present the desired illuminated effect and the maximum amount of light. If desired, the light source may be omitted, whereby the light pattern will depend purely upon incidental light to cause the reflection through the screen.

The invention both as to its organization and method of operation, together with additional objects and advantages, will best be understood from the following description of the specific embodiments when read in connection with the accompanying drawings, wherein like reference characters indicate like parts throughout:

Figure 2 is a view in cross-section taken along line 2—2 of Figure 1;

Figure 6 is a rear view in elevation of the reflecting medium;

Figure 7 is an enlarged detailed view in cross-section of the diffusing screen and reflecting medium; and Figure 8 is a detailed plan view showing the preferred form of optically effective screen.

Figure 1:
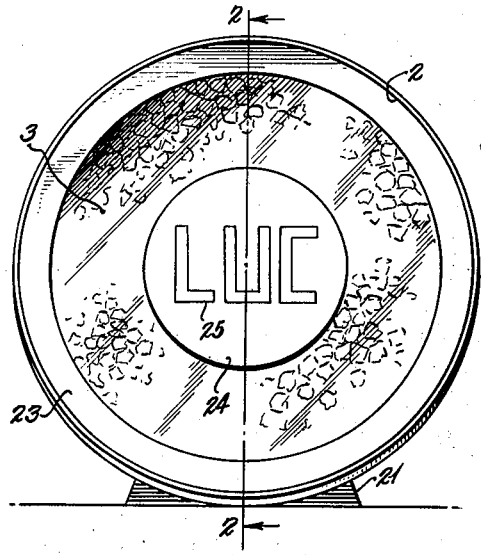
Figure 1 is a front view in elevation of the preferred embodiment of the display sign.
Figure 3:
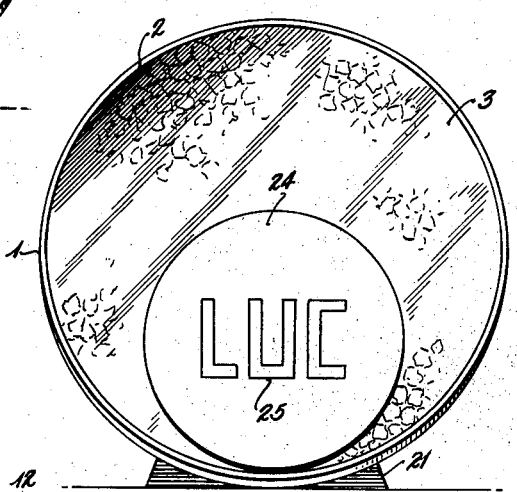
Figure 3 is a front view in elevation of a modified form of display sign.

With specific reference to the drawings the present invention may comprise a housing 1 having an opening 2 in the front thereof, within which an optically effective screen 3 may be located. Within the housing 1 and in back of the screen 3, a reflector 4 is parallelly spaced from said screen 3. The reflector 4 is mounted upon a spider 5 as best shown in Figure 6, and the hub of this spider 5 is secured to the shaft 7 of a motor 8. The motor 8 may be of any desired type, but is preferably a synchronous electric motor, such as used in electric clocks, and may be provided with an electric conducting means 9 to be connected to any convenient source. As it is preferred that the reflector should rotate at a comparatively slow and predetermined speed, a gear reduction means 10 may be associated with the motor 8.

Figure 5:
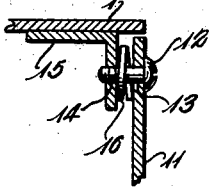
Figure 5 is a detailed view in cross-section illustrating the means for adjustably joining the walls of the housing.

The motor 8 may be secured to the rear wall 11 of the housing 1 in any convenient manner so that the reflector 4 which is mounted upon the shaft 7 of the motor will be parallelly spaced from the screen 3 when the rear wall is secured in position. As there may be some slight deviations from the parallel, it is preferred that this rear wall 11 may be adjustably mounted so that its position may be varied slightly in order to adjust the plane in which the reflector 4 will lie. Accordingly, this rear wall 11 may be secured at three equally distant points by screws 12. As best shown in Figure 5, these screws 12 may freely pass through apertures 13 in the wall 11 and into threaded apertures 14 within angle brackets 15 which may be spot welded or otherwise secured to the housing 1. Springs, such as spring washers 16, may be positioned between the rear wall 11 and the brackets 15 so that said wall 11 will be resiliently urged away from said brackets 15. Accordingly, when the rear wall is secured in position the screws 12 may be adjusted so that the reflection image received from the reflector 4 through the screen 3 will be substantially even, over the entire surface thereof, and of the proper type.

Figure 4:
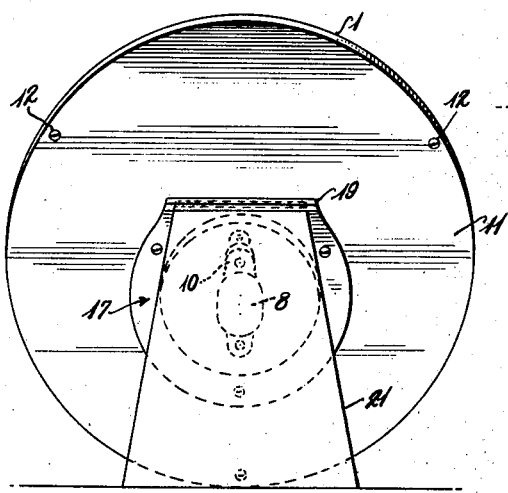
Figure 4 is a rear view in elevation of the display sign.

In order to permit a light-weight construction, the rear wall 11 is made from a relatively thin sheet of material. As this sheet is apt to warp slightly, it is preferred to strengthen it by a reinforcing member 17. The reinforcing member 17 may comprise a light-weight material that is dished or otherwise formed to provide a housing 17' for the motor 8. The side walls 18 of said housing 17' form a rigid brace to prevent the warping of the rear wall 11 so that the member 17 not only reinforces the rear wall 11 but also houses the source of power. In addition, the top edge of the reinforcing member 17 may be bent over to form a U-shaped slide 19 which is adapted to receive the angularly bent tongue 20 of a supporting member 21. The supporting member 21 extends rearwardly and downwardly at an angle and is preferably widened at its base, as best shown in Figure 4, so as to rigidly support the sign. The tongue 20 may be slidably received by the U-bracket 19 so that the supporting member 21 may be removed to permit the formation of a compact package for shipment.

A mask 23 may be located adjacent the screen 3 to prevent the perception of the area between the edge of the reflector 4 and the housing 1. In other words, regardless of the angle from which the sign is observed the whole surface of the screen will be illuminated by the reflection from the reflector 4. Due to the fact that the reflector 4 is rotated at a relatively low speed, there is no clearly perceptible dead spot in the center as compared to an accelerated movement of the image around the edges of the sign. As there is a slight difference, however, it is preferred to cover this center portion with a mask 24. In addition to acting as a mask to this center portion the member 24 may also bear advertising matter or insignia 25. The insignia 25 may be inscribed upon the mask 24 in any desired manner or may comprise cut out portions so that the image from the reflector may be visible in the spaces forming letters or other type of designs. The mask 24 need not be opaque but may be translucent or even transparent and of a colored material so as to produce an attractive color contrast. The member 24 may be located in any desired position and is shown in Figure 1 as being in the exact center of the sign and in Figure 2 as being tangent to the lower circumference.

Though the screen may be formed from many suitable types of material, it has been found that a plate of so-called "hammered glass" produces the most desirable type of image. As shown in Figures 7 and 8, this hammered glass plate has a plurality of closely adjacent, irregular and rather flat lens elements 30 formed on one side thereof. Other forms may be suitable, however, incorporating pyramids, lenses having greater curvature and geometrically spaced corrugations, and other types of formations which may be located on one or both surfaces of the plate. Although glass plates have been found to give the best type of image, plates made from many other materials are suitable, such as those produced from various types of plastic materials which are transparent or translucent.

The lens elements 30 are preferably of such formation as to substantially collimate the light rays passed therethrough. For instance, a point of light reflected at an acute angle, as shown in Figure 7, will be directed through a lens element 30 which will collimate the light rays $a$ projected thereby. Similarly, an image projected perpendicularly to the screen may likewise be collimated by the same element 30 to produce the light rays $b$. By such means, the images are substantially sharply defined so as to produce a sparkling and scintillating effect rather than a diffused or vibrating effect.

The reflector 4 is preferably made from metal foil so as to permit a light-weight construction which may be driven by the small synchronous motors at a relatively small cost. The foil sheet which comprises the reflector 4 is formed in such a manner as to produce a plurality of small reflecting faces 31 which are more or less irregular in their formation and position and particularly in their angular relation with each other. This reflector is best formed by crumpling a sheet of foil so as to produce these minute reflecting facets 31 and then smoothing the sheet out so as to produce a relatively flat member with the reflecting facets thereon positioned in such a manner as to receive light rays through the screen 3 from substantially all angles and to return the light rays back through the screen 3 so that they are visible at substantially all angles. In other words, regardless of the angle from which the sign may be observed, the reflected image from the minute facets 31 of the reflector will be visible through the screen 3, because there are a vast number of these facets which are faced in practically all directions.

Due to the fact that the image reflected by these minute reflecting facets 31 passes each of the lens elements 30 of the screen but momentarily and the angle of the reflected image is constantly varied, the illuminated image observed on the face of the screen 3 comprises a sparkling, scintillating effect rather than a clearly defined image. Furthermore, it has been found that by locating the reflector 4 within certain predetermined limits from the screen 3, that a superior image is obtained which is visible at greater angles. These limits may best be defined as the points of focus of the lens elements on the screen directly on the optical axis thereof and at the most acute angle from said axis, which is capable of being observed.

By locating the points of focus in each individual lens, a curved line A will be described surrounding the surface of each lens 30 until a point B is reached at which focusing is virtually impossible. This point B forms one limit of the distance and comprises the nearest point at which the reflector 4 should be located with respect to the screen 3. In this position the reflected image is the most clearly defined at an acute angle with respect to the screen 3 but is not so desirable when viewed directly from the front. On the other hand, if the reflector 4 is moved back until the front surface is substantially in a plane of the point of focus C on the optical axis D of each lens, the image is the most sharply defined when viewed directly from the front. At the rearmost position of the reflector 4, however, the angular visibility of the image is comparatively poor, just as the direct visibility of the image is comparatively poor when the reflector 4 is located close to the screen. Consequently, by locating the reflector in a plane midway between these two points B and C of focus, a good image is obtained at substantially all angles. This is partially caused by the depth of focus of the lens elements 30 and partially due to the undulating form of the reflector 4 which provides portions of the surface substantially in critical focus at both limitations.

While the reflector 4 has been described as being made of metal foil, other materials are suitable which may comprise heavier members. Furthermore, the reflecting surface may be more or less regularly formed to simplify production. Other changes may be effected provided that an undulating reflecting surface is produced which has a majority of the surface located at an angle with respect to the general plane thereof. While these reflecting faces 31 may be produced by curved formations, it has been found that the most desirable effect is obtained from a reflector having a sharp angular definition between the facets 31 of its surface.

Although certain specific embodiments of the present invention have been shown and described, many modifications thereof are possible, and the present disclosure should be construed only in an illustrative sense. The present invention, therefore, is not to be restricted except insofar as is necessitated by the prior art and by the spirit of the appended claims.

I claim:

1. Apparatus for display and advertising purposes, comprising in combination a screen and a reflector adapted to rotate with respect thereto, said screen comprising hammered glass and said reflector comprising a relatively flat member the reflecting surface of which is formed into a plurality of angularly disposed reflecting facets, the majority of the facets of said reflector lying at an angle to a perpendicular to the optical surface of said screen, the optically effective formations of said hammered glass screen and said angularly disposed reflecting facets cooperating to receive and direct light rays at substantially all angles and to produce variable scintillating illuminating effects.

2. Apparatus for display and advertising purposes, comprising in combination a screen and a reflector adapted to rotate with respect thereto, said screen comprising hammered glass and said reflector comprising a relatively flat member the reflecting surface of which is formed into a plurality of angularly disposed reflecting facets, said facets being irregularly and haphazardly located on said reflector, the optically effective formations of said hammered glass screen and said angularly disposed reflecting facets cooperating to receive and direct light rays at substantially all angles and to produce variable scintillating illuminating effects.

3. Apparatus for display and advertising purposes, comprising in combination a screen and a reflector adapted to rotate with respect thereto, said screen comprising hammered glass and said reflector comprising a relatively flat member the reflecting surface of which is formed into a plurality of angularly disposed irregularly shaped reflecting facets, the optically effective formations of said hammered glass screen and said angularly disposed irregular reflecting facets cooperating to receive and direct light rays at substantially all angles and to produce variable scintillating illuminating effects.

4. Apparatus for display and advertising purposes, comprising in combination a screen and a reflector adapted to rotate in a parallel plane with respect thereto, said screen comprising hammered glass and said reflector comprising a relatively flat member the reflecting surface of which is formed into a plurality of angularly disposed reflecting facets, the majority of the facets of said reflector lying at an angle to a perpendicular to the optical surface of said screen, the optically effective formations of said hammered glass screen and said angularly disposed reflecting facets cooperating to receive and direct light rays at substantially all angles and to produce variable scintillating illuminating effects.

5. Apparatus for display and advertising purposes, comprising in combination a screen and a reflector adapted to rotate with respect thereto, said screen comprising hammered glass which is provided with a plurality of lenticular elements on at least one surface thereof and said reflector comprising a relatively flat member the reflecting surface of which is formed into a plurality of angularly disposed reflecting facets, said reflector being spaced from said screen within limits defined by the axial focal point and the critical angle focal point of said lenticular elements, the optically effective formations of said hammered glass screen and said angularly disposed reflecting facets cooperating to receive and direct light rays at substantially all angles and to produce variable scintillating illuminating effects.

6. Apparatus for display and advertising purposes, comprising in combination a screen and a reflector adapted to rotate with respect thereto, said screen comprising hammered glass which is provided with a plurality of lenticular elements on at least one surface thereof, and said reflector comprising a relatively flat metal foil member the reflecting surface of which is formed into a plurality of angularly disposed reflecting facets, said reflector being spaced from said screen within limits defined by the axial focal point and the critical angle focal point of said lenticular elements, the rearmost edges of said angularly disposed reflecting facets being positioned substantially at said axial focal point, the optically effective formations of said hammered glass screen and said angularly disposed reflecting facets cooperating to receive and direct light rays at substantially all angles and to produce variable scintillating illuminating effects.

7. Apparatus for display and advertising purposes, comprising in combination a screen and a reflector adapted to rotate with respect thereto, said screen comprising hammered glass and said reflector comprising a relatively flat member the reflecting surface of which is formed into a plurality of angularly disposed reflecting facets, the major portion of said surface comprising reflecting facets which lie at an angle to the general plane of said reflector, the optically effective formations of said hammered glass screen and said angularly disposed reflecting facets cooperating to receive and direct light rays at substantially all angles and to produce variable scintillating illuminating effects.

8. Apparatus for display purposes comprising in combination a housing having an opening in the front wall thereof and a rear wall which is removably attached thereto, an optically effective screen located within said opening, a reflector located within said housing and adapted to rotate with respect to said screen, and a motor supported by said rear wall so that its drive shaft extends substantially perpendicularly to said wall, said reflector being mounted upon the drive shaft whereby said reflector will be positioned with respect to said rear wall, said rear wall being adjustably secured to said housing, whereby to permit adjustment of said reflector with respect to said screen.

9. Apparatus for display and advertising purposes, comprising in combination an optically effective screen and a reflector adapted to rotate with respect thereto, and said reflector comprising a relatively flat member the reflecting surface of which is formed into a plurality of angularly disposed reflecting facets, the optically effective formations of said optically effective screen and said angularly disposed reflecting facets cooperating to receive and direct light rays at substantially all angles and to produce variable patterned illuminating effects, and a mask associated with said screen to cover the portion adjacent the center of the reflector, whereby to eliminate the visibility of any dead spots in the variable motion illuminating effects, said mask being adapted to have advertising insignia incorporated therewith.

10. The method of illuminating a sign which comprises directing light rays to a reflector, and reflecting said rays at a multiplicity of angles of incidence to an optically effective screen, in such a manner that substantially all of the reflected light rays strike the incident surface of the screen at an angle of incidence less than the critical angle.

11. The method of illuminating a sign which comprises directing light rays to a reflector, and movably reflecting said rays at a multiplicity of angles of incidence to an optically effective screen in such a manner that substantially all of the reflected light rays strike the incident surface of the screen at an angle of incidence less than the critical angle.

12. The method of illuminating a sign which comprises directing light rays to a reflector, and reflecting said rays at a multiplicity of angles of incidence to a screen having a plurality of lenticular elements on one side thereof in such a manner that substantially all of the reflected light rays strike the incident surface of the screen at an angle of incidence less than the critical angle.

13. The method of illuminating a sign which comprises directing light rays to a reflector, reflecting said rays at a multiplicity of angles of incidence to an optically effective screen in such a manner that substantially all of the reflected light rays strike the incident surface of the screen at an angle of incidence less than the critical angle, and passing said rays through and beyond said screen by refraction so that the ray images are visible at substantially all angles.

14. The method of illuminating a sign which comprises directing light rays to a reflector, reflecting said rays at a multiplicity of angles of incidence to a screen having a plurality of lenticular elements on one side thereof in such a manner that substantially all of the reflected light rays strike the incident surface of the screen at an angle of incidence less than the critical angle, and collimating said light by passing said rays through said screen.

15. The method of producing a scintillating effect in a sign which consists of providing a metal foil reflector consisting of a plurality of irregularly disposed facets behind a screen having optically effective formations thereon, impinging light rays on said reflector, and reflecting said rays back onto the optical surface of said screen at a plurality of angles less than the critical angle.

16. The method of producing a scintillating effect in a sign which consists of providing a metal foil reflector consisting of a plurality of irregularly disposed facets behind a screen having optically effective formations thereon, passing light rays through said screen, impinging said rays on said reflector, and reflecting said rays back onto the optical surface of said screen at a plurality of angles less than the critical angle.

17. The method of providing a scintillating effect in a sign which consists of providing a metal foil reflector consisting of a plurality of irregularly disposed facets behind a screen having optically effective formations thereon, passing light rays through said screen, impinging said rays on said reflector, reflecting said rays back onto the optical surface of said screen in a plurality of directions non-parallel to a perpendicular to the optical surface of said screen.

18. The method of providing a scintillating effect in a sign which consists of providing a metal foil reflector consisting of a plurality of irregularly disposed facets behind an optically effective glass screen consisting of lenticular optical surfaces, passing parallel light rays through said screen, impinging said rays on said reflector, and reflecting said rays back onto the optical surface of said screen at a plurality of angles less than the critical angle.

19. The method of producing a scintillating effect in a sign which consists of providing a metal foil reflector consisting of a plurality of irregularly disposed facets, rotating said reflector behind a screen consisting of lenticular optical surfaces, passing light rays through said screen, impinging said rays on said reflector, and reflecting said rays back onto the optical surface of said screen at a plurality of angles less than the critical angle.

20. The method of producing a scintillating effect in a sign which consists of providing a metal foil reflector consisting of a plurality of irregularly disposed facets behind a screen consisting of lenticular optical surfaces, passing light rays through said screen, rotating said reflector through a plane parallel to said screen, impinging said rays on said reflector, and reflecting said rays back onto the optical surface of said screen at a plurality of angles less than the critical angle.

21. Apparatus for display and advertising purposes, comprising in combination an optically effective screen and a reflector adapted to rotate with respect thereto, said reflector comprising a relatively flat member the reflecting surface of which is formed into a plurality of angularly disposed reflecting facets, the optically effective formations of said optically effective screen and said angularly disposed reflecting facets cooperating to receive and direct light rays at substantially all angles and to produce variable patterned illuminating effects, and a mask associated with said screen adjacent the edge only thereof and overlapping the edge of the reflector to prevent observation beyond the edge of said reflector.

GEORGE H. EVANS.